United States Patent [19]
Adams et al.

[11] Patent Number: 5,933,835
[45] Date of Patent: *Aug. 3, 1999

[54] METHOD AND APPARATUS FOR MANAGING MULTIMEDIA DATA FILES IN A COMPUTER NETWORK BY STREAMING DATA FILES INTO SEPARATE STREAMS BASED ON FILE ATTRIBUTES

[75] Inventors: Robert Adams, Lake Oswego; Burt W. Perry, Beaverton; John W. Richardson; David M. Williams, both of Portland; Nelson L. Yaple, Aloha, all of Oreg.

[73] Assignee: Intel Corporation, Santa Clara, Calif.

[*] Notice: This patent is subject to a terminal disclaimer.

[21] Appl. No.: 08/831,804

[22] Filed: Apr. 9, 1997

Related U.S. Application Data

[63] Continuation of application No. 08/536,138, Sep. 29, 1995, Pat. No. 5,737,495.

[51] Int. Cl.[6] .................................................. G06F 17/30
[52] U.S. Cl. ...................... 707/104; 707/10; 395/200.49
[58] Field of Search ......................... 395/200.33, 200.49; 707/2, 3, 10, 104

[56] References Cited

U.S. PATENT DOCUMENTS

| | | | |
|---|---|---|---|
| 5,063,494 | 11/1991 | Davidowski et al. | 395/800 |
| 5,291,594 | 3/1994 | Sekiguchi et al. | 395/600 |
| 5,357,630 | 10/1994 | Oprescu et al. | 395/600 |
| 5,412,808 | 5/1995 | Baner | 707/1 |
| 5,471,318 | 11/1995 | Ahuja et al. | 358/400 |
| 5,524,195 | 6/1996 | Clanton, III et al. | 395/155 |
| 5,535,338 | 7/1996 | Krause et al. | 395/200.2 |
| 5,537,417 | 7/1996 | Sharma et al. | 370/94.1 |
| 5,737,495 | 4/1998 | Adams et al. | 395/615 |

OTHER PUBLICATIONS

"Integration of CAD/CAE with Multimedia Teleconferencing and Messaging Via Broadband Networks and Shared Resource Servers", Leter F. Ludwig, 1990 1st International Conference on Systems Integration, pp. 136–143.

"Communications Support for Multi Media Applications", M. Bever, et al, IEEE Conference 1990, pp. 115–120.

*Primary Examiner*—Lance Leonard Barry, Esq.
*Attorney, Agent, or Firm*—Blakely, Sokoloff, Taylor & Zafman LLP

[57] ABSTRACT

The present invention manages multimedia data files in a computer network by receiving a request from a first unit on the network, processing the request to determine file attributes of the request and redirecting the request based on the file attributes of the request, to a second unit on the network. The invention further receives a response that includes data files streamed into separate data streams based on the file attributes of the response. The present invention also selects for use appropriate buffering protocol units and data transportation units, based on the file attributes of the data files in the separate data streams.

36 Claims, 4 Drawing Sheets

METHOD AND APPARATUS FOR MANAGING MULTIMEDIA DATA FILES IN A COMPUTER NETWORK BY STREAMING DATA FILES INTO SEPARATE STREAMS BASED ON FILE ATTRIBUTES

This is a continuation of application Ser. No. 08/536,138, filed Sep. 29, 1995 now U.S. Pat. No. 5,737,495.

FIELD OF THE INVENTION

The present invention relates to the field of data management in a computer network. More particularly, the present invention relates to a method and apparatus for managing multimedia data files in a computer network.

BACKGROUND OF THE INVENTION

Multimedia applications are amongst the fastest growing applications in the computer industry today. These applications typically integrate different types of data, for example text, audio, video and graphics information. In order to effectively create multimedia applications, authors rely heavily upon multimedia authoring tools. Video on demand and rich interactive multimedia titles have large amounts of digital video and audio, which depend on a continuous (isochronous) output stream. Currently, no multimedia authoring tools support automatic network delivery of titles, but rather assume that all of the title content is resident on the local PC, typically on hard disk or CDROM. In today's systems, multimedia authoring tools typically load performance critical sections of the title into memory. This approach will not work with digital video and audio because a typical high quality 320×240 resolution digital video clip consumes 500 Kb to 1 Mb of data per second. Clearly, 30 second video clips cannot be stored in memory or on the local hard disk.

One prior computer system allows for retrieval of audio and video data from a remote computer using a separate programming interface. The programming interface is then used for traditional remote access. Retrieval of audio and video data through this interface, however, requires the use of -special commands and instructions. These special commands and instruction increase the burden on software developers trying to develop multimedia software.

Audio and video data, by their very nature, are also time dependent. Current multimedia authoring tools assume that the bandwidth characteristics of the network are fixed and can be determined reliably without delay. This assumption is inaccurate, however, because network bandwidth is generally variable over time, and subject to latency (time delay between when a request for data is made and the data actually arrives at the requester). The audio and video data must be retrieved at the appropriate time and must be available for use by the computer system at the appropriate time. When data is retrieved over a network from a remote location, however, the arrival of the data at the computer system is often unpredictable and causes the data to be temporarily unavailable. The unavailability of data can be caused by network collisions and bandwidth differences between different segments of the network. The fast-growing "Information Superhighway" also changes the dynamics of multimedia delivery systems. Increasingly, multimedia servers will be connected, via cable, telephone or other communications lines, to network connections that are capable of more than 10 Mbits per second downstream bandwidth. This increase in capability does not, however, resolve the problem of variable network bandwidth and latency.

As a result of this uncertainty, the time dependent audio or video presentation may experience a discontinuity due to the unavailability of audio or video data. In the case of video data, there is typically a sequence of images (frames) which, when the images are displayed in rapid sequence (e.g., each frame being displayed for ⅓₀th of a second immediately after displaying a prior frame), will create the impression of a motion picture. The human eye is particularly sensitive to a discontinuity in a motion picture and the discontinuity would manifest itself as a stutter in the video image or a 'freeze-up' (e.g., a single frame being displayed considerably longer than ⅓₀th of a second) in the video image. With audio presentations, the discontinuity would manifest itself as a period of silence or a pause, or perhaps a change in the pitch of the audio sounds. These types of discontinuities create undesirable effects in multimedia presentations and can noticeable degrade the quality of a presentation when audio or video data is required from a remote location over a network.

SUMMARY OF THE INVENTION

It is therefore an object of the present invention to provide a method and apparatus for managing multimedia data files in a computer network. Specifically, the present invention allows secure, transparent, isochronous delivery of high quality digital video and audio intensive multimedia titles over existing networks.

The present invention manages the multimedia data files in a computer network by receiving a request from a first unit on the network, processing the request to determine file attributes of the request and redirecting the request based on the file attributes of the request, to a second unit on the network. The invention further receives a response that includes data files streamed into separate data streams based on the file attributes of the response. The present invention also selects for use appropriate buffering protocol units and data transportation units, based on the file attributes of the data files in the separate data streams.

Other objects, features and advantages of the present invention will be apparent from the accompanying drawings and from the detailed description.

BRIEF DESCRIPTION OF THE DRAWINGS

The objects, features and advantages of the present invention will be apparent from the following detailed description of the preferred embodiment of the invention with references to the following drawings.

DETAILED DESCRIPTION OF THE PREFERRED EMBODIMENT

A method and apparatus for managing multimedia data files in a computer network running multimedia applications is described. "Data files," as used in this application, refers to any form of data collection including data stored in a file or in a database, data dynamically generated by a program on a server, data captured or processed from a source device such as a camera or a microphone on a server, or data copied from another source by a server. In the following detailed description, numerous specific details are set forth in order to provide a thorough understanding of the present invention. It will, however, be understood by those skilled in the art that the present invention may be practiced without those specific details. In other instances, well-known methods, procedures, components, and circuits have not been described in detail so as not to unnecessarily obscure the present invention.

Some portions of the detailed description which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to those quantities. Unless specifically stated otherwise, as apparent from the following discussions, it is appreciated that throughout the present invention, discussions utilizing terms such as "processing" or "computing" or "calculating" or "determining" or "displaying" or the like, refer to the action and the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
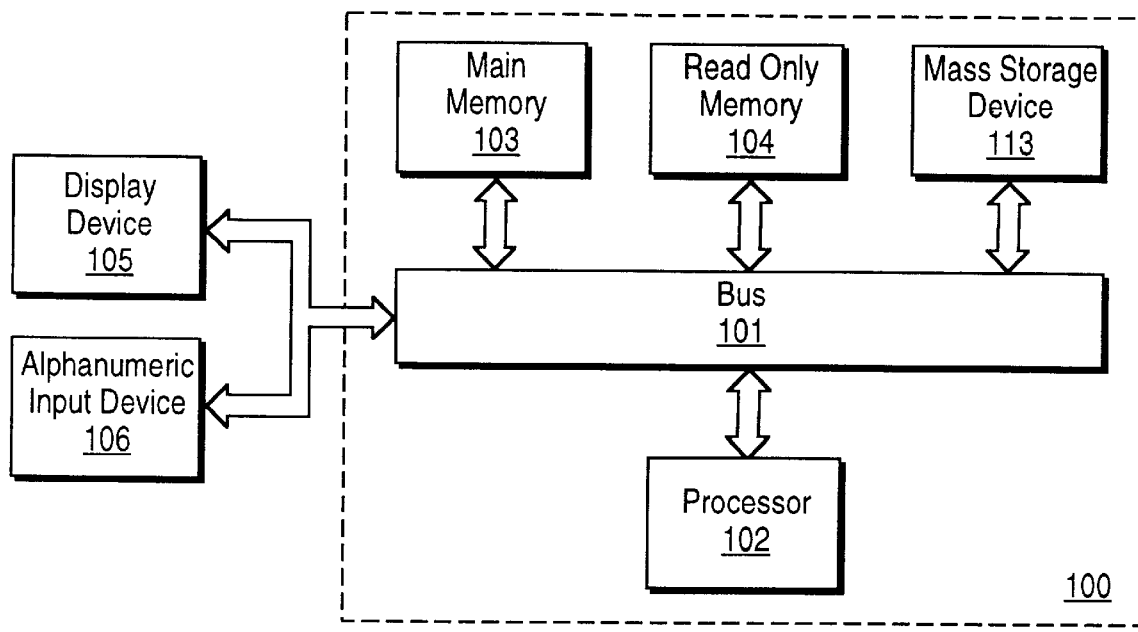
FIG. 1 illustrates the system hardware architecture of the computer of the present invention.

FIG. 1 illustrates a typical computer system 100 architecture in which the present invention operates. The preferred embodiment of the present invention is implemented on an IBM™ PC computer manufactured by IBM Corporation of Armonk, N.Y. It will be apparent to those of ordinary skill in the art, however, that alternative computer system architectures may be employed. In general, such computer systems as illustrated by FIG. 1 comprise a bus 101 for communicating information, a processor 102 coupled with the bus 101 for processing information, main memory 103 coupled with the bus 101 for storing information and instructions for the processor 102, a read only memory 104 coupled with the bus 101 for storing static information and instructions for the processor 102, a display device 105 coupled with the bus 101 for displaying information for a computer user, an alphanumeric input device 106 coupled with the bus 101 for communicating information and command selections to the processor 102, and a mass storage device 113, such as a magnetic disk and associated disk drive, coupled with the bus 101 for storing information and instructions.

Processor 102 may be any of a wide variety of general purpose processors or microprocessors such as the i486™ or Pentium™ brand microprocessor manufactured by Intel Corporation of Santa Clara, Calif. It will be apparent to those of ordinary skill in the art, however, that other varieties of processors may be used in a particular computer system. Display device 105 may be a liquid crystal device, cathode ray tube (CRT), or other suitable display device. Mass storage device 113 may be a conventional hard disk drive, floppy disk drive, or other magnetic or optical data storage device for reading and writing information stored on a hard disk, a floppy disk, a magnetic tape, or other magnetic or optical data storage medium.

In general, processor 102 retrieves processing instructions and data from a data storage medium using data storage device 113 and downloads this information into random access memory 103 for execution. Processor 102, then executes an instruction stream from random access memory 103 or read-only memory 104. Command selections and information input at alphanumeric input device 106 are used to direct the flow of instructions executed by processor 102. The results of this processing execution are then displayed on display device 105.

Figure 2A:
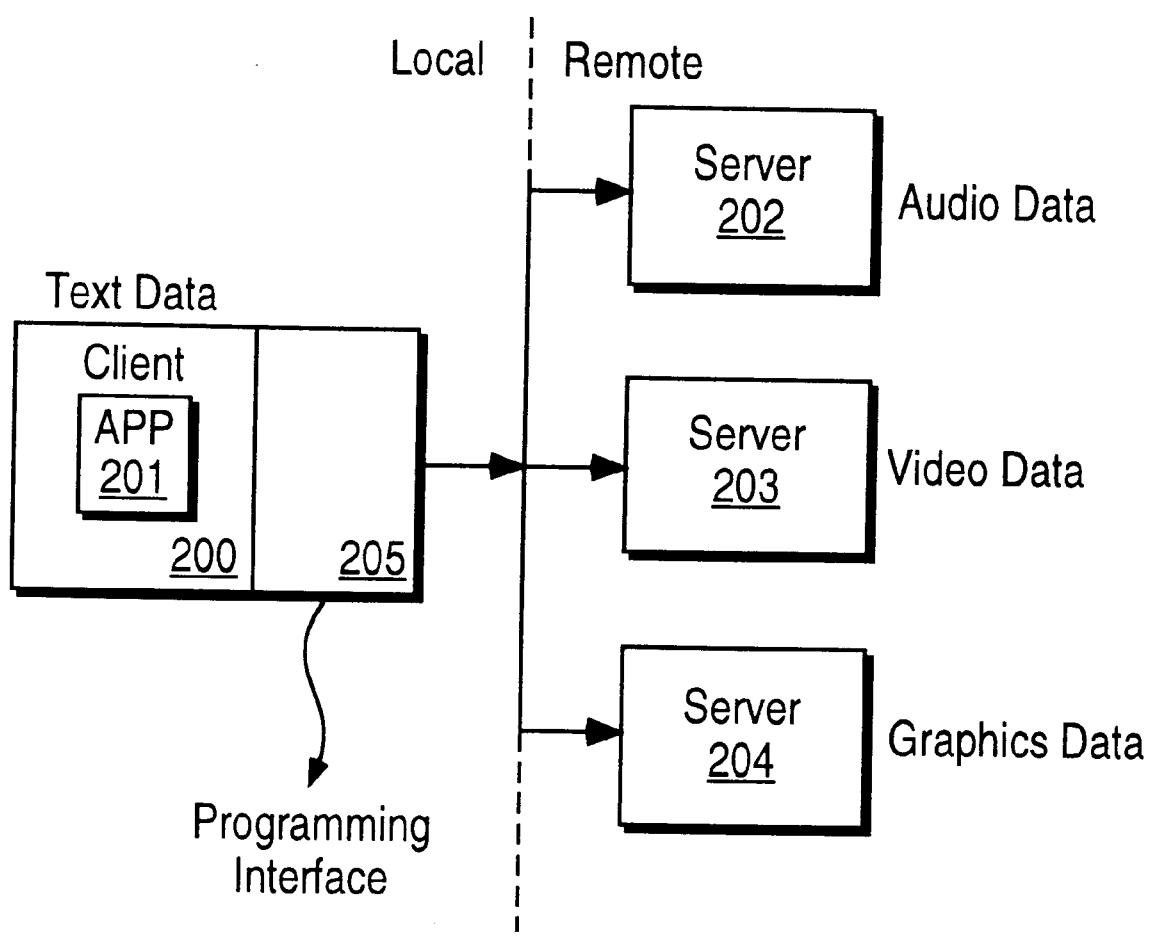
FIG. 2A illustrates, in block diagram form, an example prior art computer network running multimedia applications.

FIG. 2A illustrates an example of a prior art computer network running multimedia applications. It will be apparent to one skilled in the art that different data types can reside on a single computer or on a number of different computers in a network. For clarity, FIG. 2A shows the different data types residing on different computers in a network. In this example prior art network, Client 200 is running multimedia application 201 that requires text data residing on Client 200, audio data residing on server 202, video data residing on server 203, and graphics data residing on server 204. These data types may be referred to as "file attributes" of the data. Application 201 can retrieve text data off local Client 200, but in order to be able to retrieve the data off remote servers 202, 203 and 204, current methods require that the applications use a separate programming interface 205 to specifically handle different file attributes and request specific data off the various remote file servers.

Figure 2B:
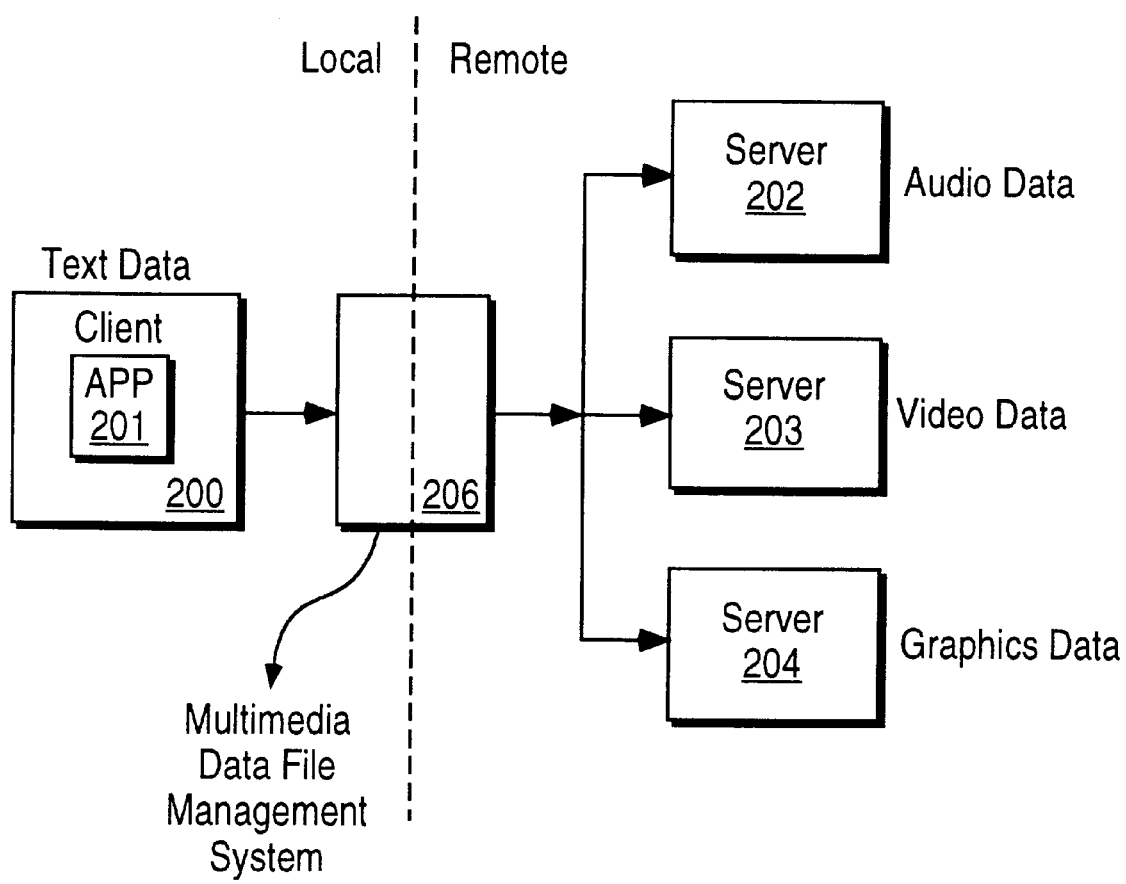
FIG. 2B illustrates, in block diagram form, an example computer network running multimedia applications, utilizing the present invention to manage the multimedia data files.

The present invention presents an alternative solution, namely a data management system that is independent of the applications, and addresses the issue of isochronous data delivery. This alternative solution is illustrated in FIG. 2B. As illustrated, multimedia data file management system 206 is independent of multimedia application 201, replacing programming interface 205 that was dependent on multimedia application 201. Multimedia file management system 206 is also independent of the computer network, including the physical communications media. For example, the present invention is able to function on a Local Area Network (LAN) or over a phone system. It will be apparent to those of ordinary skill in the art, however, that the present invention will function equally well on a variety of other network systems, such as Wide Area Networks (WANs), and over various other types of physical media, such as cable or satellite systems.

Figure 3:
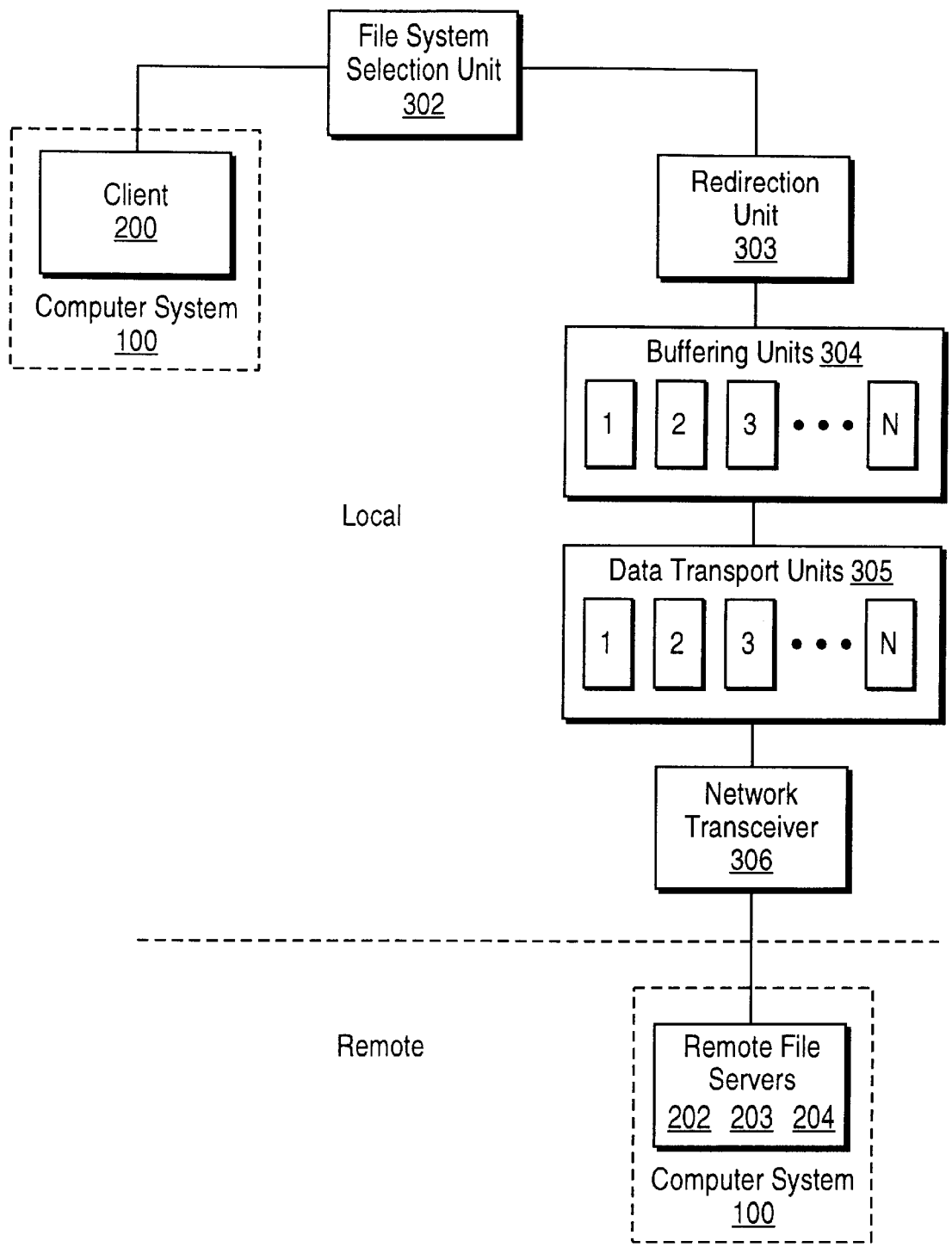
FIG. 3 illustrates, in block diagram form, one portion of an example computer network running multimedia applications, utilizing the present invention to manage the multimedia data files.

FIG. 3 illustrates in block diagram form one portion of the computer network described above, utilizing the claimed invention to manage the multimedia data files. The network system comprises Client 200, file system selection unit 302, redirection unit 303, buffering units 304 (1)–(n), data transport protocol units 305 (1)–(n), network transceiver 306 and remote file servers 202, 203 and 204. Network transceiver 306 can include phone modems, ISDN modems, cable modems, optical modems, ethernet, IR modems and RF modems. It will be apparent to those of ordinary skill in the art, however, that the present invention may be utilized with various other types of network transceivers.

Examples of buffering units 304 (1)–(n) include database buffering units, realtime buffering units, video buffering units and audio buffering units. Client 200 and remote file servers 202, 203 and 204 each comprise a typical computer system 100, as illustrated in FIG. 1. It will be apparent to those of ordinary skill in the art that use of other types of computer systems is also possible. Client 200 retrieves local data files from a local mass storage device, and remote data files from remote mass storage devices on remote file servers 202, 203 and 204. Depending on the system, different access methods can be used to retrieve different data types. For example, in one preferred embodiment of the present invention, whole tracks are read for video data while random access database data are read a block at a time.

The data files on both systems can be data files with various file attributes, namely video data files, audio data files, ASCII text data files, numerical data files or other data files. In one preferred embodiment of the present invention, the file system selection unit 302 comprises the operating system that chooses between the local and remote file systems. Other embodiments of the present invention can be implemented to use alternate standard interfaces instead of file system selection unit 302. For example, in the Microsoft Windows· environment, the present invention can utilize the Windows™ Media Control Interface (MCI™), the Windows™ network connections interface (WINSOCK™) or other data access application interfaces. Redirection unit 303 is coupled to Client 200 and decides between different buffering units and data transport protocol units for the data, depending on the type of data requested. The redirection unit 303 makes decisions based on various sources, including the filename and application information embedded in the files.

The present invention thus manages the multimedia data files in the computer network by receiving a request from a first unit on the network, processing the request to determine file attributes of the request and redirecting the request based on the file attributes of the request, to a second unit on the network. The invention further receives a response that includes data files streamed into separate data streams based on the file attributes of the response. The present invention also selects for use appropriate buffering protocol units and data transportation units, based on the file attributes of the data files in the separate data streams.

For instance, a stream buffering or continuous flow protocol can be used for video and audio data, while a least recently used buffering algorithm may be used for database data. Additionally, the type of networking transport protocol can be different for the different data types. For example, a streaming NACK based protocol could be used for video data, while a simple request-response protocol, with windowing flow control, could be used for database data. Redirection unit 303 utilizes selective redirection to direct data file requests from the application program. In some computer system implementations, for example, the redirector unit 303 can determine the data type to be the "extensions" added to the file name. As an example, ".AVI" following the file name generally indicates a digital video file. In one preferred embodiment of the present invention, if the redirector unit 303 encounters a ".AVI" file, it selects video buffering unit 304 (n) and streaming NACK based transport protocol unit 305 (n) to direct and buffer the video data.

Similarly, buffering units 304 (1)–(n) operate in conjunction with the selective redirection code and interpret based on the data type, the type of buffering that should be used for the data. The buffering units address the problem of unreliable network delivery and latency by anticipating requests for data in one of many ways. The buffering units thus reduce the time required to transmit the data when requested by the multimedia application. For example, one buffering protocol is the simple prefetch buffering protocol. Under this protocol, even if a read of a small data size is made, the buffering code does a large read presuming the application will want the data later. The additional data is stored in buffering unit until required by the application program. High and low "watermarks" are used to control the simple prefetch buffering by establishing a minimal amount of data to have in the buffer at any given time as well as a maximum amount of data.

Another buffering protocol is dependent on the file name of the requested data. The filename is used to chose a buffering protocol. For example, in FIG. 3, if client 200 requests digital video data and file system selection unit 302 determines that the data is on network file server 203, redirector unit 303 automatically selects a buffering protocol based on the "extensions" added to the filename. For example, ".AVI" following the file name generally indicates a digital video file. A third buffering protocol is the working set protocol. Under the working set protocol, the most frequently accessed executable files and data files that the application often needs are buffered onto the local hard disk for the duration of the execution of the application program. One such file is a .WAV file that plays during times of user inactivity.

A fourth buffering protocol is the client disk cache protocol. Under the client disk cache protocol, low priority data from the network server can be buffered onto a local hard disk instead of local random access memory.

A fifth buffering protocol is the static usage profile protocol. Under the static usage profile protocol, profiles are generated for application programs and for data files. The profiles include information that indicate how a database is accessed and information of future requirements for a data file based on the retrieval of a prior data file. The profiles are used to predict future data requirements and are used by buffering units to intelligently prefetch and buffer data.

A sixth buffering protocol is the dynamic usage profile protocol. Under the dynamic usage profile protocol, profiles are used similarly to the static usage profile protocol. Under the dynamic usage profile protocol, however, buffering is based on client specific file profiles that are built up from client usage patterns.

A seventh buffering protocol is the server pacing protocol. Under the server pacing protocol, the server uses network monitoring utilities to measure its ability to send data. The ability for the server to send data is based on network availability, and processor capability and load. In this manner, the server is able to properly pace data delivery to the client.

Finally, an eighth buffering protocol is the server caching protocol. Under the server caching protocol, disk caching on the server side is utilized to increase the response time of a given buffering protocol by decreasing the time between file request and the start of the data stream to the buffering unit.

In addition to various buffering protocols, the present invention also utilizes application "profiles" to improve application response time. These application profiles consist of usage patterns of the requested data, thus enabling modification of prefetching and holding rules of the buffering protocols. For instance, the application developer may know that when the application has just accessed a certain type of data, the next request will most likely be one of three choices. This known fact allows the application developer to create a profile for the application, usable by the buffering protocols to preload one or all three types of possibly needed data. The profiles may also originate from sources other than the application developer. For example, the profiles may be generated by information coded into the application (application hints), information obtained from a special "profile generation run" of the application, information obtained from a previous use of the application by the current user or other users or requirements and conditions of the available server resources, network bandwidth or client resouces. It will be apparent to those of ordinary skill in the art that the present invention may also utilize any other type of application hinting mechanisms available.

In the foregoing description, the invention is described with reference to specific exemplary embodiments thereof. It will, however, be evident that various modifications and changes may be made thereto without departing from the broadest spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in now way intended to be considered limiting. Therefore, references to details of particular embodiments are not intended to limit the scope of the claims, which in themselves recited only those features regarded as essential to the invention.

We claim:

1. A computer implemented method for managing multimedia data files in a computer network, said computer implemented method comprising the steps of:
   receiving a request from a first unit on said computer network,
   processing said request to determine file attributes of a response to said request, said file attributes including a data type of said response; and
   redirecting automatically said request based on said file attributes of said request, to a second unit on said computer network, said second unit being compatible with said file attributes.

2. The computer implemented method as described in claim 1 further including the step of receiving on said first unit said response to said request redirected to said second unit, said response including data files, said data files being streamed into separate data streams based on said file attributes.

3. The computer implemented method as described in claim 2 wherein said steps of receiving said response further includes the step of selecting a transport protocol from a plurality of transport protocols based on said file attributes of said data files in said separate data streams.

4. The computer implemented method as described in claim 3 wherein said plurality of transport protocols includes a stream buffering protocol, a continuous flow protocol, and a NACK-based protocol.

5. The computer implemented method as described in claim 2 wherein said step of receiving on said first unit said response to said request redirected to said second unit, further includes the step of buffering said separate data streams based on said file attributes of said data files in said separate data streams.

6. The computer implemented method as described in claim 5 wherein said step of buffering said separate data streams further includes the step of using filename extensions of said data files in said separate data streams to determine an appropriate buffering protocol for buffering said data stream.

7. The computer implemented method as described in claim 5 wherein said step of buffering said separate data streams further includes the step of using a server pacing protocol on said second unit to properly pace said response to said request from said first unit.

8. The computer implemented method as described in claim 5 wherein said step of buffering said separate data streams further includes the step of using a server caching protocol to decrease time between said request and start of said response to said request from said first unit.

9. The computer implemented method as described in claim 5 wherein said step of buffering said separate data streams further includes the step of using an application hint from an application on said first unit to anticipate and prefetch application data files.

10. The computer implemented method as described in claim 9 wherein said application hint is generated by information coded in said application.

11. The computer implemented method as described in claim 9 wherein said application hint is a usage profile for said application, said usage profile being generated from a profile run of said application.

12. The computer implemented method as described in claim 11 wherein said usage profile for said application is generated from a previous use of said application by a user.

13. A computer apparatus for managing multimedia data files on a computer network, said apparatus comprising:
    a processor for receiving a request from a first unit on said computer network;
    said processor further for processing said request to determine file attributes of a response to said request, said file attributes including a data type of said response; and
    a redirection unit for redirecting automatically said request based on said file attributes of said request, to a second unit on said computer network [system], said second unit being compatible with said file attributes.

14. The computer apparatus as described in claim 13 wherein said processor is further for receiving on said first unit said response to said request redirected to said second unit, said response including data files, said data files being streamed into separate data streams based on said file attributes.

15. The computer apparatus as described in claim 14 wherein said processor is further for selecting a transport protocol from a plurality of transport protocols based on said file attributes of said data files in said separate data streams.

16. The computer apparatus as described in claim 15 wherein said plurality of transport protocols includes a stream buffering protocol, a continuous flow protocol, and a NACK-based protocol.

17. The computer apparatus as described in claim 14 further including a buffering unit for buffering said separate data streams based on said file attributes of said data files in said separate data streams.

18. The computer apparatus as described in claim 17 wherein said buffering unit for buffering said separate data streams further utilizes filename extensions of said data files in said separate data streams to determine an appropriate buffering protocol for buffering said data stream.

19. The computer apparatus as described in claim 17 wherein said buffering unit for buffering said separate data streams further utilizes a server pacing protocol on said second unit to properly pace said response to said request from said first unit.

20. The computer apparatus as described in claim 17 wherein said buffering unit for buffering said separate data streams further utilizes a server caching protocol to decrease time between said request and start of said response to said request from said first unit.

21. The computer apparatus as described in claim 17 wherein said buffering unit for buffering said separate data streams further utilizes an application hint from an application on said first unit to anticipate and prefetch application data files.

22. The computer apparatus as described in claim 21 wherein said application hint is generated by information coded in said application.

23. The computer apparatus as described in claim 21 wherein said application hint is a usage profile for said application, said usage profile being generated from a profile run of said application.

24. The computer apparatus as described in claim 14 wherein said usage profile for said application is generated from a previous use of said application by a user.

25. A computer system for managing multimedia data files in a computer network system, said computer system comprising:
   a means for receiving a request from a first unit on said computer network system;
   a means for processing said request to determine file attributes of a response to said request, said file attributes including a data type of said response;
   a means for automatically redirecting said request based on said file attributes of said request, to a second unit on said computer network system, said second unit being compatible with said file attribute.

26. The computer system as described in claim 25 further including a means for receiving on said first unit said response to said request redirected to said second unit, said response including data files, said data files being streamed into separate data streams based on said file attributes.

27. The computer system as described in claim 26 wherein said means for receiving said response further includes a means for selecting a transport protocol from a plurality of transport protocols based on said file attributes of said data files in said separate data streams.

28. The computer system as described in claim 27 wherein said plurality of transport protocols includes a stream buffering protocol, a continuous flow protocol, and a NACK-based protocol.

29. The computer system as described in claim 26 wherein said means for receiving on said first unit said response to said request redirected to said second unit, further includes a means for buffering said separate data streams based on said file attributes of said data files in said separate data streams.

30. The computer system as described in claim 29 wherein said means for buffering said separate data streams further includes a means for using filename extensions of said data files in said separate data streams to determine an appropriate buffering protocol for buffering said data stream.

31. The computer system as described in claim 29 wherein said means for buffering said separate data streams further includes a means for using a server pacing protocol on said second unit to properly pace said response to said request from said first unit.

32. The computer system as described in claim 29 wherein said means for buffering said separate data streams further includes a means for using a server caching protocol to decrease time between said request and start of said response to said request from said first unit.

33. The computer system as described in claim 29 wherein said means for buffering said separate data streams further includes a means for using an application hint from an application on said first unit to anticipate and prefetch application data files.

34. The computer system as described in claim 33 wherein said application hint is generated by information coded in said application.

35. The computer system as described in claim 33 wherein said application hint is a usage profile for said application, said usage profile being generated from a profile run of said application.

36. The computer system as described in claim 35 wherein said usage profile for said application is generated from a previous use of said application by a user.

* * * * *